(12) United States Patent
Huang

(10) Patent No.: US 11,145,039 B2
(45) Date of Patent: Oct. 12, 2021

(54) DYNAMIC TONE MAPPING METHOD, MOBILE TERMINAL, AND COMPUTER READABLE STORAGE MEDIUM

(71) Applicant: SHENZHEN SKYWORTH-RGB ELECTRONIC CO., LTD., Guangdong (CN)

(72) Inventor: Zhe Huang, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 83 days.

(21) Appl. No.: 16/550,744

(22) Filed: Aug. 26, 2019

(65) Prior Publication Data
US 2019/0378253 A1 Dec. 12, 2019

Related U.S. Application Data

(63) Continuation of application No. PCT/CN2018/102096, filed on Aug. 24, 2018.

(30) Foreign Application Priority Data

Dec. 22, 2017 (CN) .......................... 201711418472.9

(51) Int. Cl.
G06T 5/00 (2006.01)
G06T 5/20 (2006.01)
(Continued)

(52) U.S. Cl.
CPC ............. G06T 5/009 (2013.01); G06T 5/007 (2013.01); G06T 5/20 (2013.01); G06T 5/50 (2013.01);
(Continued)

(58) Field of Classification Search
CPC .. G06T 5/009; G06T 5/20; G06T 5/50; G06T 2207/20208; G06T 2207/20021;
(Continued)

(56) References Cited

U.S. PATENT DOCUMENTS

2009/0041376 A1* 2/2009 Carletta ..................... G06T 5/50
382/274
2015/0071537 A1* 3/2015 Lim ......................... G06T 5/008
382/168
(Continued)

FOREIGN PATENT DOCUMENTS

CN 101854557 A 10/2010
CN 102741883 A 10/2012
(Continued)

OTHER PUBLICATIONS

Supplementary European Search Report dated Nov. 3, 2020; Appln. No. 18891929.4.
(Continued)

Primary Examiner — Nay A Maung
Assistant Examiner — Daniella M. DiGuglielmo

(57) ABSTRACT

The present disclosure provides a dynamic tone mapping method, a mobile terminal, and a computer readable storage medium. The method includes: acquiring maximum brightness information and average brightness information of a frame to be displayed on the display terminal; inquiring a tone mapping data group respectively corresponding to the maximum brightness information and the average brightness information in a preset tone mapping look-up table; and calling the tone mapping data group and transforming a tone mapping on the frame to be displayed on the display terminal. The present disclosure can change the tone mapping data group for transforming the tone mapping in real time according to the maximum brightness information and the average brightness information of the frame monitored
(Continued)

in real time, to reasonably utilize the hardware dynamic range and present a better HDR effect.

11 Claims, 6 Drawing Sheets

(51) Int. Cl.
*G06T 5/50* (2006.01)
*G06T 7/90* (2017.01)
*G06F 3/14* (2006.01)
*G09G 5/06* (2006.01)

(52) U.S. Cl.
CPC .................. *G06T 7/90* (2017.01); *G06F 3/14* (2013.01); *G06T 2207/10016* (2013.01); *G06T 2207/10024* (2013.01); *G06T 2207/20021* (2013.01); *G06T 2207/20208* (2013.01); *G09G 5/06* (2013.01); *G09G 2320/0626* (2013.01)

(58) Field of Classification Search
CPC . G06T 2207/10016; G06T 2207/10024; G06T 5/007; G06T 7/90; G09G 2320/0626; G09G 5/06; G06F 3/14
USPC ......................................................... 382/274
See application file for complete search history.

(56) References Cited

U.S. PATENT DOCUMENTS

| 2016/0345017 | A1  | 11/2016 | Lasserre et al. |            |
|--------------|-----|---------|-----------------|------------|
| 2016/0360174 | A1* | 12/2016 | Tao             | H04N 5/265 |
| 2017/0103729 | A1* | 4/2017  | Huang           | H04N 9/68  |
| 2017/0272690 | A1* | 9/2017  | Seifi           | G06T 5/009 |
| 2017/0358063 | A1  | 12/2017 | Ying et al.     |            |

FOREIGN PATENT DOCUMENTS

| CN | 103353982 A | 10/2013 | |
| CN | 105139368 A | 12/2015 | |
| CN | 105282452 A | 1/2016 | |
| CN | 105869112 A | 8/2016 | |
| CN | 106981054 A | 7/2017 | |
| CN | 108053381 A | 5/2018 | |
| WO | WO-2017200149 A1 * | 11/2017 | ............ G06T 5/009 |

OTHER PUBLICATIONS

International Search Report dated Dec. 3, 2018; PCT/CN2018/102096.

Wu An, et al; "Optimizing and Implementing the High Dynamic Range Video Algorithom", Journal of Computer Research and Development; vol. 54(5), pp. 1077-1085; 2017.

Ishtiaq Rasool Khan, et al.; "A Tone-Mapping Technique Based on Histogram Using a Sensitivity Model of the Human Visual System", IEEE Transactions on Industrial Electronics, vol. 65, No. 4, Apr. 2018; pp. 3469-3479.

Qingquan Wu, et al.; "A Novel Real-Time Method for High Dynamic Range Image Tone Mapping", Published in: 2014 4th IEEE International Conference on Information Science and Technology; Apr. 26-28, 2014; 5 pages.

The First Chinese Office Action dated Jul. 27, 2021; Appln. No. 201711418472.9.

* cited by examiner

DYNAMIC TONE MAPPING METHOD, MOBILE TERMINAL, AND COMPUTER READABLE STORAGE MEDIUM

CROSS-REFERENCE TO RELATED APPLICATIONS

The present disclosure is a Continuation Application of PCT Application with No. PCT/CN2018/102096, filed on Aug. 24, 2018, which claims the priority of Chinese Patent Application with No. 201711418472.9, entitled "DYNAMIC TONE MAPPING METHOD, MOBILE TERMINAL, AND COMPUTER READABLE STORAGE MEDIUM", filed on Dec. 22, 2017, which is hereby incorporated by reference in its entirety.

TECHNICAL FIELD

The present disclosure relates to the technology field of high dynamic range image processing, and more particularly relates to a dynamic tone mapping method, a mobile terminal, and a computer readable storage medium.

BACKGROUND

High dynamic range (HDR) images has being widely used in the fields of computer graphics and image processing. The HDR video has a dynamic range of brightness matched with the real scene. Currently, the brightness ranges of HDR10 videos are all around 0.001 nits to 1000 nits based on the producing concept of HDR video. As ST.2084 itself covers the brightness from 0.000001 nits to 10000 nits, the HDR10 video would have a very high requirement for hardware.

As such, when the brightness of the hardware cannot cover the video content completely, the brightness of video should be designed to be compressed with reference to the hardware conditions as well as the concept of HDR video. The average frame brightness in the video, however, cannot be maintained consistent from beginning to end. And the compression of the brightness cannot be adjusted according to the change of the average frame brightness, resulting in a waste of the dynamic range of the hardware and a poor HDR performance.

SUMMARY

It is therefore one main objective of the disclosure to provide a dynamic tone mapping method, a mobile terminal, and a computer readable storage medium, aiming to solve the problem that the compression of the brightness cannot be adjusted according to the change of the average brightness of the frame when the HDR display terminal displays HDR10 video pictures, which results in a waste of the dynamic range of the hardware and a poor HDR effect.

In order to achieve the above objective, the exemplary embodiment of the present disclosure provides a dynamic tone mapping method which includes:

acquiring maximum brightness information and average brightness information of a frame to be displayed on the display terminal;

inquiring a tone mapping data group respectively corresponding to the maximum brightness information and the average brightness information in a preset tone mapping look-up table; and calling the tone mapping data group and transforming a tone mapping on the frame to be displayed on the display terminal.

Optionally, the operation of acquiring maximum brightness information and average brightness information of a frame to be displayed on the display terminal includes:

dividing the frame to be displayed on the display terminal into a plurality of blocks based on a hardware parameter of the display terminal, and monitoring maximum sub-brightness information and average sub-brightness information of each of the blocks; and counting statistically the maximum sub-brightness information and the average sub-brightness information of each of the blocks, and calculating the maximum brightness information and the average brightness information of the frame to be displayed on the display terminal.

Optionally, prior to the operation of inquiring a tone mapping data group respectively corresponding to the maximum brightness information and the average brightness information in a preset tone mapping look-up table, the method further includes:

debugging and generating a plurality of tone mapping data groups with different dynamic ranges and different average brightness based on a dynamic range specification of a high dynamic range hardware, and storing the generated tone mapping data groups to generate the tone mapping look-up table.

Optionally, the operation of inquiring a tone mapping data group respectively corresponding to the maximum brightness information and the average brightness information in a preset tone mapping look-up table further includes:

determining whether the maximum brightness information and the average brightness information have a logical relationship with the tone mapping data group in the tone mapping look-up table; and if yes, calling the tone mapping data group and transforming the tone mapping on the frame to be displayed on the display terminal.

Optionally, after the operation of determining whether the maximum brightness information and the average brightness information have a logical relationship with the tone mapping data group in the tone mapping look-up table, the method further includes:

if no, confirming whether the maximum brightness information and the average brightness information of one of the blocks is replaceable by the maximum brightness information and the average brightness information of an adjacent block.

Optionally, after the operation of confirming whether the maximum brightness information and the average brightness information of one of the blocks is replaceable by the maximum brightness information and the average brightness information of an adjacent block, the method further includes:

researching the tone mapping data group respectively corresponding to the replaced maximum brightness information and the replaced average brightness information in the tone mapping look-up table, if the maximum brightness information and the average brightness information of one of the blocks is replaceable by the maximum brightness information and the average brightness information of the adjacent block in the tone mapping look-up table.

Optionally, after the operation of confirming whether the maximum brightness information and the average brightness information of one of the blocks is replaceable by the maximum brightness information and the average brightness information of an adjacent block, the method further includes:

debugging and generating a new tone mapping data group according to the maximum brightness information and the average brightness information, if the maximum brightness information and the average brightness information of one of the blocks fail to be replaceable by the maximum brightness information and the average brightness information of an adjacent block in the tone mapping look-up table; and storing the maximum brightness information, the average brightness information, and a corresponding dynamic range and average brightness information in the new tone mapping data group, into the tone mapping look-up table.

Optionally, the operation of acquiring maximum brightness information and average brightness information of a frame to be displayed on the display terminal includes:

setting a lag time for acquiring the maximum brightness information and the average brightness information on the basis of a hardware parameter of the display terminal, and acquiring the maximum brightness information and the average brightness information after the lag time.

The present disclosure further provides a mobile terminal, which includes: a memory, a processor, and a dynamic tone mapping program stored on the memory and executable on the processor, the dynamic tone mapping program when executed by the processor performs the operations of the dynamic tone mapping method described above.

The present disclosure further provides a computer readable storage medium, a dynamic tone mapping program is stored in the computer readable storage medium, the dynamic tone mapping program when executed by a processor performs the operations of the dynamic tone mapping method described above.

The present disclosure inquires a tone mapping data group respectively corresponding to the maximum brightness information and the average brightness information in a preset tone mapping look-up table through acquiring maximum brightness information and average brightness information of a frame to be displayed on the display terminal in real time, and then calls the tone mapping data group for transforming a tone mapping on the frame to be displayed on the display terminal. Therefore, the tone mapping data group can be changed in real time according to the maximum brightness information and the average brightness information of the frame monitored in real time, to reasonably utilize the hardware dynamic range and present a better HDR effect.

The realization of the aim, functional characteristics, advantages of the present disclosure are further described specifically with reference to the accompanying drawings and embodiments.

DETAILED DESCRIPTION

It should be understood that the specific embodiments described herein are merely illustrative of the present disclosure and are not intended to limit the present disclosure.

In the following description, usage of suffixes such as "module", "part", or "unit" used for referring to elements is given merely to facilitate explanation of the present disclosure, without having any significant meaning by itself. Accordingly, the "module", "part", and "unit" may be mixedly used.

Figure 1:
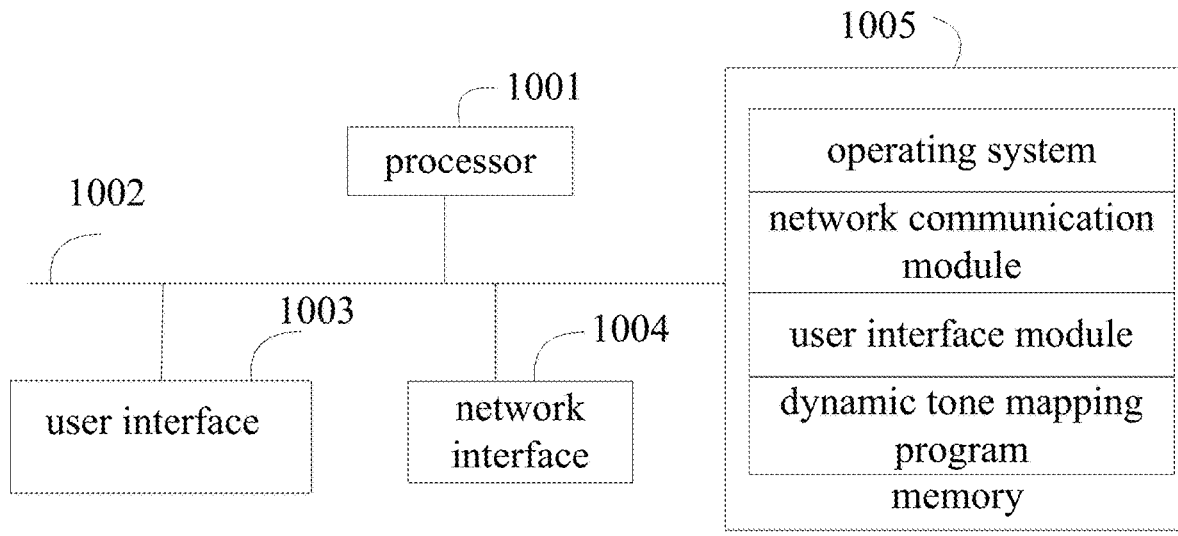
FIG. 1 is a structural diagram of an optional mobile terminal hardware according to some embodiments of the present disclosure.

Referring to FIG. 1, FIG. 1 is a structural diagram of an optional mobile terminal hardware according to some embodiments of the present disclosure.

The terminal in the exemplary embodiment of the present disclosure may be a personal computer (PC), a smart phone, a tablet computer, an e-book reader, an MP3 (Moving Picture Experts Group Audio Layer III) player, an MP4 (Moving Picture Experts Group Audio Layer IV) player, a portable computer, or other portable terminal devices with display function.

Referring to FIG. 1, the terminal may include a processor 1001, such as a CPU, a network interface 1004, a user interface 1003, a memory 1005, and a communication bus 1002. The communication bus 1002 is configured for implementing connection and communication among these components. The user interface 1003 can include a display, an input unit such as a keyboard. Optionally, the user interface 1003 can also include a standard wired interface, a wireless interface. Optionally, the network interface 1004 can include a standard wired interface, and a wireless interface, such as a Wi-Fi interface. The memory 1005 may be a high speed RAM memory or a non-volatile memory, such as a disk memory. The memory 1005 can also optionally be a storage device independent of the aforementioned processor 1001.

Optionally, the terminal may also include a camera, an radio frequency (RF) circuit, a sensor, an audio circuit, a Wi-Fi module, etc. The sensor includes a light sensor, a motion sensor, and other sensors. Specifically, the light sensor may include an ambient light sensor and a proximity detector, the ambient light sensor may adjust the brightness of the display according to the brightness of the ambient light, and the proximity detector may turn off the display and/or backlight when the mobile terminal moves to the ear. The gravity acceleration sensor, as a kind of motion sensor, can detect the magnitude of acceleration in each direction (usually in the directions of x, y, z axes). The gravity acceleration sensor can detect the magnitude and direction of gravity when stationary, and the gravity acceleration sensor can be used in applications for identifying the posture of the mobile terminal (such as switching between portrait and landscape orientation, related games, posture calibration by magnetometer), and can also be used in functions relating to vibration recognition (such as pedometer, and tapping), and so on. Of course, the mobile terminal can also be equipped with other sensors such as gyroscope, barometer, hygrometer, thermometer, infrared sensor, etc. No need to repeat again.

It would be understood by those skilled in the art that the terminal structure shown in FIG. 1 does not constitute a limitation to the terminal, and the terminal may include more or less components, or a combination of certain components, or components different from these illustrated.

As shown in FIG. 1, the memory 1005 as a computer storage medium includes an operating system, a network communication module, a user interface module, and a dynamic tone mapping program.

In the terminal shown in FIG. 1, the network interface 1004 is mainly configured to connect with a background server and perform data communication with the background server. The user interface 1003 is mainly configured to connect with a client (such as a user end), and perform data communication with the client. And the processor 1001 can be configured to call the dynamic tone mapping program stored in the memory 1005.

Various embodiments of the dynamic tone mapping method and the mobile terminal of the present disclosure are provided on the basis of the hardware structure of the mobile terminal and the communication network system.

Figure 2:
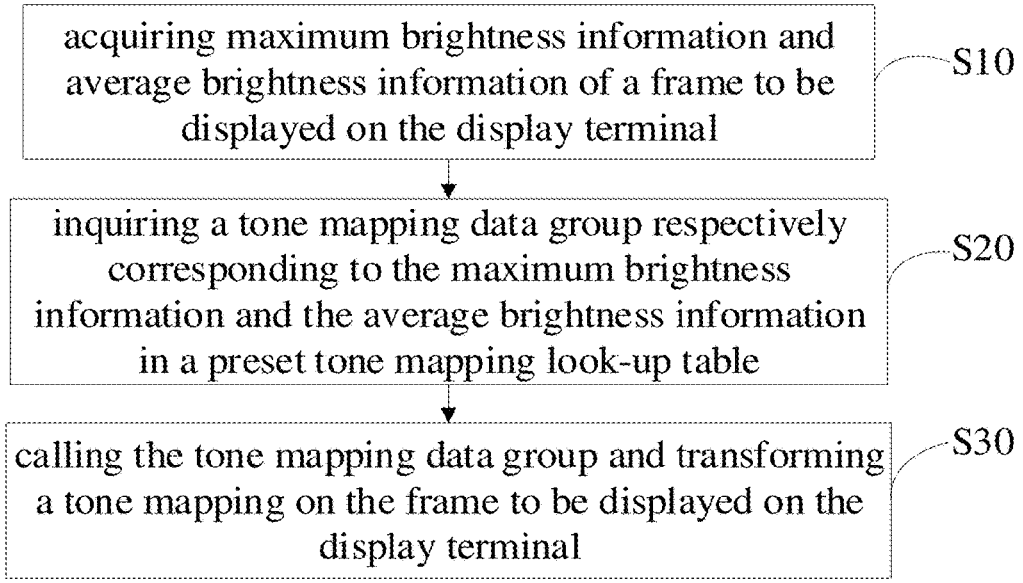
FIG. 2 is a flow chart of a dynamic tone mapping method according to an exemplary embodiment of the present disclosure.

The present disclosure provides a dynamic tone mapping method. Referring to FIG. 2, in an exemplary embodiment the method includes:

Step S10, acquiring maximum brightness information and average brightness information of a frame to be displayed on the display terminal.

The frame to be displayed on the display terminal can be defined as a picture in the HDR10 video which is to be tone mapped and obtained through an HDR Decoder step. The mobile terminal can display the HDR10 video to be tone mapped according to the user instruction. Brightness refers to a brightness degree of the picture. Its unit is candela per square meter ($cd/m^2$) or nits, which is the candlelight per square meter. The maximum brightness information and average brightness information of each of the frames in the HDR 10 video are acquired.

Step S20, inquiring a tone mapping data group respectively corresponding to the maximum brightness information and the average brightness information in a preset tone mapping look-up table.

The tone mapping look-up table is a table composed of a plurality of tone mapping data groups with different dynamic ranges and different average brightness which are debugged and generated based on a dynamic range specification of a high dynamic range hardware. For example, if the maximum brightness information and the average brightness information of the actually acquired frame are 4000 nits and 500 nits, respectively, then, the tone mapping data group debugged according to the average brightness of 500 nits and the maximum brightness of 4000 nits can be found out in the tone mapping look-up table.

Step S30, calling the tone mapping data group and transforming a tone mapping on the frame to be displayed on the display terminal.

The corresponding tone mapping data group in the tone mapping look-up table is called to transform the tone mapping on the frame to be displayed. For example, when the frame has the average brightness of 500 nits and the maximum brightness of 4000 nits, the tone mapped data group in the tone mapping look-up table with a dynamic range of 0.001 nits to 2000 nits and an average brightness of 300 nits is obtained. When the acquired frame has the average brightness of 500 nits and the maximum brightness of 4000 nits, the tone mapped data group in the tone mapping look-up table with a dynamic range of 0.001 nits to 2000 nits and an average brightness of 300 nits is called to transform the tone mapping on the frame to be displayed.

In the exemplary embodiment, the present disclosure inquires a tone mapping data group respectively corresponding to the maximum brightness information and the average brightness information in a preset tone mapping look-up table through acquiring maximum brightness information and average brightness information of a frame to be displayed on the display terminal in real time, and then calls the tone mapping data group to transform the tone mapping on the frame to be displayed on the display terminal. The above steps are repeated until the video is over. Therefore, the tone mapping data group can be changed in real time according to the maximum brightness information and the average brightness information of the frame monitored in real time, to reasonably utilize the hardware dynamic range and present a better HDR effect.

Figure 5:
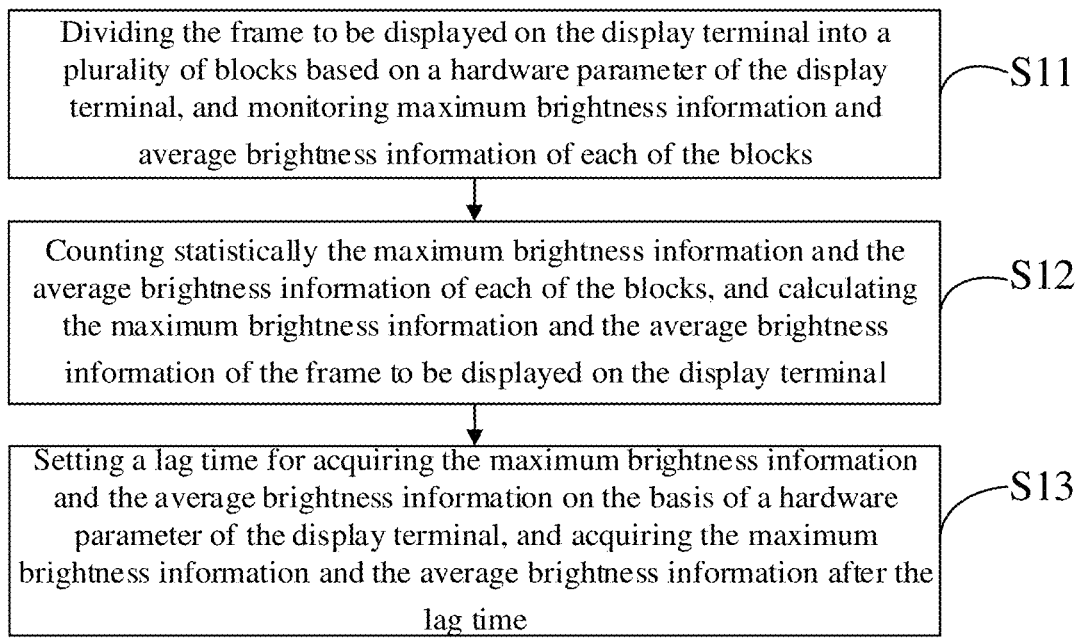
FIG. 5 is a detailed flow chart of step 10 of FIG. 2 according to an embodiment of the present disclosure.

Optionally, referring to FIG. 5, in another exemplary embodiment, the step S10 of acquiring maximum brightness information and average brightness information of a frame to be displayed on the display terminal includes:

Step S11, dividing the frame to be displayed on the display terminal into a plurality of blocks based on a hardware parameter of the display terminal, and monitoring maximum sub-brightness information and average sub-brightness information of each of the blocks.

The whole frame is divided into m multiplied by n blocks in a matrix mode according to the hardware backlight partitioning method. For example, the original frame is divided into 20×12 sub-blocks based on the size of the display terminal and the number of the lamp beads. That is, the frame is divided into 20 equal-sized sub-blocks along the horizontal direction, and 12 equal-sized sub-blocks along the vertical direction, a total of 240 sub-blocks. Specifically, all the LEDs in the direct type backlight are divided into a plurality of small units, and the area backlight brightness control circuit in the hardware main control circuit or the separately set area backlight brightness control circuit divides the entire frame into a plurality of small units, the quantity of small units of the entire frame is corresponding to that of the small units of LEDs. There may be several or a dozen LEDs in one unit. The backlight LEDs in the same small unit are controlled by the same LED driving circuit, and the illumination brightness of the backlight LEDs are equal to each other. Monitoring maximum sub-brightness information and average sub-brightness information of each of the blocks means that calculating and counting the color coordinate points of each of pixels in each of the sub-blocks. Based on the characteristic of the ST.2084 standard, the brightness coding value corresponds to the brightness value one by one. For the YUV color coding method, "Y" represents brightness which is also regarded as gray scale value, and "U" and "V" represent color degree, which is configured to describe the image color and saturation, and specify the color of the pixel. Since the importance of adopted YUV color space is that its brightness signal Y and color degree signals U, V are separated, only the Y value of the YUV code of each pixel needs to be extracted, and the maximum sub-brightness information and the average sub-brightness information of each block can be obtained.

Step S12, counting statistically the maximum sub-brightness information and the average sub-brightness information of each of the blocks, and calculating the maximum brightness information and the average brightness information of the frame to be displayed on the display terminal.

According to the maximum sub-brightness information and the average sub-brightness information of each block obtained in the step S11, the maximum brightness information and average brightness information of the frame can be obtained through counting and averaging the maximum sub-brightness information and the average sub-brightness information directly.

The whole process of tone mapping includes: calculating the average brightness of the frame according to the current frame first, then selecting an appropriate dynamic range according to the average brightness, and mapping the whole frame to the dynamic range to obtain the mapping result. Currently, the log-average brightness is commonly used as the average brightness, which can be calculated based on the following formula:

$$\overline{L_w} = \frac{1}{N} \exp\left(\sum_{x,y} \log(\delta + L_w(x, y))\right)$$

Lw(x,y) is regarded as the brightness of the pixel (x, y), N is regarded as the number of pixels in the frame, S is regarded as a overflow constant, which is a small number used to deal with the condition that the pixel is pure black.

In the exemplary embodiment, in order to improve the efficiency and accuracy of detecting the maximum brightness information and the average brightness information of each frame to be displayed, the frame is divided into a plurality of blocks based on the parameters of the used hardware, the quantity of the blocks are m×n, the brightness of each sub-block is detected by counting the Y value of YUV coding of each pixel. Finally, the detected results of each block detection are counted and averaged, thereby obtaining the maximum brightness information and the average brightness information of the frame to be displayed quickly and accurately.

Figure 6:
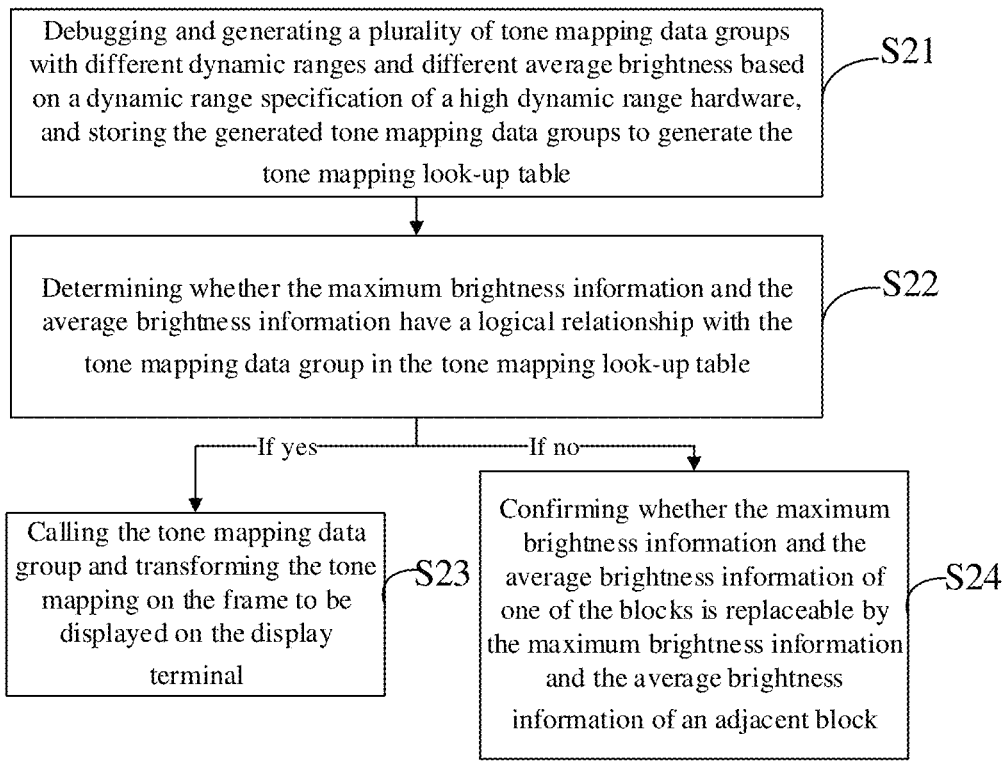
FIG. 6 is a flow chart showing steps prior to step S20 of FIG. 2 according to an embodiment of the present disclosure.

Optionally, referring to FIG. 6, in another exemplary embodiment, prior to the step S20 of inquiring a tone mapping data group respectively corresponding to the maximum brightness information and the average brightness information in a preset tone mapping look-up table, the method further includes:

Step S21, debugging and generating a plurality of tone mapping data groups with different dynamic ranges and different average brightness based on a dynamic range specification of a high dynamic range hardware, and storing the generated tone mapping data groups to generate the tone mapping look-up table.

Since the tone mapping data is usually large, calculating and generating the tone mapping data in real time could consume a lot of operation resources, which may affect processor processing efficiency. Ideally, the tone mapping data can be stored in the look-up table. For example, according to the dynamic range specification of the specific hardware parameter, the following 40 groups of tone mapping data are generated, and the 40 groups of tone mapping data are stored to form the tone mapping look-up table.

The dynamic range is from 0.001 nits to 500 nits, the average brightness is 100 nits, 200 nits, 300 nits, 500 nits respectively.

The dynamic range is from 0.001 nits to 1000 nits, the average brightness is 100 nits, 200 nits, 300 nits, 500 nits, 800 nits, 1000 nits respectively.

The dynamic range is from 0.001 nits to 1500 nits, the average brightness is 100 nits, 200 nits, 300 nits, 500 nits, 800 nits, 1000 nits, 1200 nits, 1500 nits respectively.

The dynamic range is from 0.001 nits to 2000 nits, the average brightness is 100 nits, 200 nits, 300 nits, 500 nits, 800 nits, 1000 nits, 1200 nits, 1500 nits, 1800 nits, 2000 nits respectively.

The dynamic range is from 0.001 nits to 4000 nits, the average brightness is 100 nits, 200 nits, 300 nits, 500 nits, 800 nits, 1000 nits, 1200 nits, 1500 nits, 1800 nits, 2000 nits, 3000 nits, 4000 nits respectively.

For example, in the above tone mapping look-up table, the tone mapping data group having the dynamic range of 0.001 nits to 500 nits and the average brightness of 200 nits is debugged and obtained according to the maximum brightness of 500 nits and the average brightness of 200 nits. When looking up the table, the brightness data group having the maximum brightness of 500 nits and the average brightness of 200 nits matches with the tone mapping data group having the dynamic range of 0.001 nits to 500 nits and the average brightness of 200 nits in the tone mapping look-up table.

In the exemplary embodiment, the tone mapping data groups are generated by debugging the parameter of the specific hardware parameter, and the tone mapping data groups are stored to form the tone mapping look-up table, which could avoid calculating and generating the tone mapping data in real time in the process of tone mapping transformation, which may result a large consumption of operation resources and affect the processing efficiency of processor.

Optionally, in another exemplary embodiment, the step S20 of inquiring a tone mapping data group respectively corresponding to the maximum brightness information and the average brightness information in a preset tone mapping look-up table, further includes:

Step S22, determining whether the maximum brightness information and the average brightness information have a logical relationship with the tone mapping data group in the tone mapping look-up table.

The logical relationship is a correspondence between the maximum luminance information and the average luminance information of the actually acquired frame to be displayed and the maximum luminance information and the average luminance information of the tone mapping data group in the generated tone mapping look-up table.

Step S23, if yes, calling the tone mapping data group and transforming the tone mapping on the frame to be displayed on the display terminal.

For example, in the above 40 groups of tone mapping data, the one mapping data group having the dynamic range of 0.001 nits to 500 nits and the average brightness of 200 nits are debugged and obtained according to the maximum brightness of 500 nits and the average brightness of 200 nits. The maximum brightness and the average brightness of the actually obtained frame to be displayed are 500 nits and 200 nits respectively, and it is conducted to find the logical relationship between the data group having the maximum brightness information and the average brightness information actually obtained above and the tone mapping data group in the tone mapping look-up table. In the exemplary embodiment, the actually obtained frame has the maximum brightness of 500 nits and the average brightness of 200 nits, which are consistent with the maximum brightness of 500 nits and the average brightness of 200 nits used for debugging, and the actually obtained maximum brightness information and average brightness information have the logical relationship with the tone mapping data group in the tone mapping look-up table. The tone mapping data group with the dynamic range of 0.001 nits to 500 nits and the average brightness of 200 nits are called for tone mapping transformation.

In the exemplary embodiment, the maximum brightness information and the average brightness information of the to-be-displayed picture of the display terminal to be displayed are compared with the maximum brightness information and the average brightness information used for debugging the tone mapping data set in the tone mapping look-up table, thereby obtaining the maximum brightness actually obtained. The relationship between the information and the average luminance information and the tone mapping data set in the tone mapping look-up table facilitates invoking the tone mapping data set for tone mapping transformation by the actually obtained maximum luminance information and the average and average luminance information.

Figure 7:
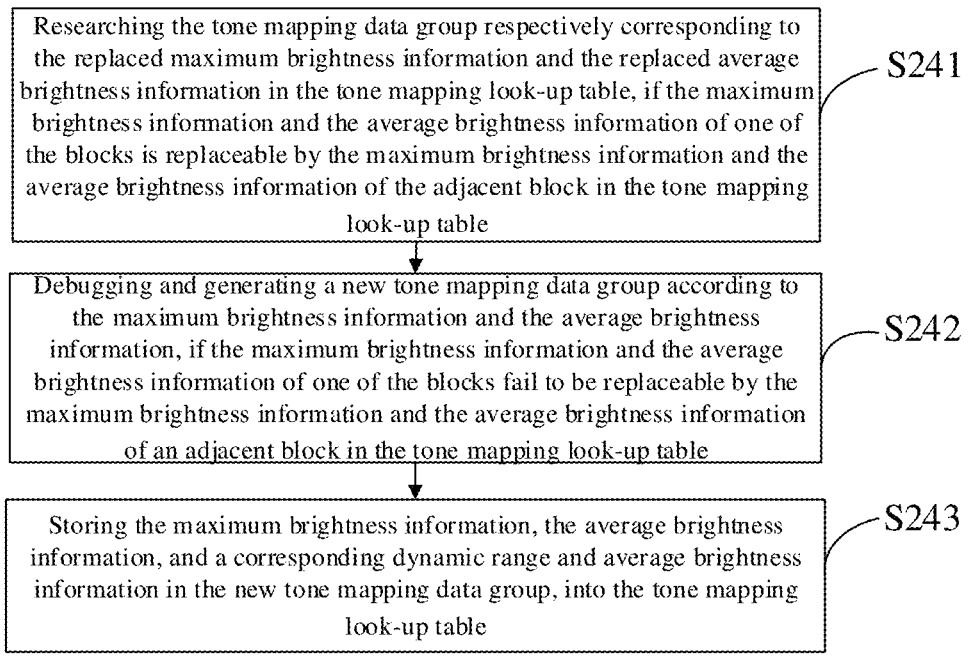
FIG. 7 is a flow chart showing steps after step S24 of FIG. 6 according to an embodiment of the present disclosure.

Optionally, referring to FIG. 7, in an another exemplary embodiment, after the step S22 of determining whether the maximum brightness information and the average brightness information have a logical relationship with the tone mapping data group in the tone mapping look-up table, the method further includes:

Step S24, if no, confirming whether the maximum brightness information and the average brightness information of one of the blocks is replaceable by the maximum brightness information and the average brightness information of an adjacent block.

Step S241, researching the tone mapping data group respectively corresponding to the replaced maximum brightness information and the replaced average brightness information in the tone mapping look-up table, if the maximum brightness information and the average brightness information of one of the blocks is replaceable by the maximum brightness information and the average brightness information of the adjacent block in the tone mapping look-up table.

If the maximum brightness information and the average brightness information do not have the logical relationship with the tone mapping data group in the tone mapping look-up table, which means that the maximum brightness information and the average brightness information are different from the maximum brightness information and the average brightness information in the debugged tone mapping data group in the tone mapping look-up table. Each of the tone mapping data groups may correspond to one maximum brightness range and one average brightness range. For example, a group of the tone mapping data groups has the dynamic range of 0.001 nits to 500 nits and the average brightness of 200 nits. The tone mapping data group is debugged according to the maximum brightness of 500 nits and the average brightness of 200 nits. According to hardware parameters, the maximum brightness of 450 nits to 550 nits and the average brightness of 120 nits to 220 nits are debugged out, and the maximum brightness within the range of 450 nits to 550 nits and average brightness values with the range of 120 nits to 220 nits are corresponding to the tone mapping data group. For example, when it is detected that the maximum brightness of 490 nits and the average brightness of 210 nits are not consistent with the maximum brightness of 500 nits and the average brightness of 200 nits used for debugging, but it is detected that the maximum brightness of 490 nits and the average brightness of 210 nits are close to the maximum brightness of 500 nits and the average brightness of 200 nits respectively, that is, the maximum brightness of 500 nits and the average brightness of 200 nits are able to replace the maximum brightness of 490 nits and the average brightness of 210 nits respectively, the maximum brightness of 500 nits and the average brightness of 200 nits are called and debugged to obtain a group having the dynamic range of 0.001 nits to 500 nits and the average brightness of 200 nits which are used for tone mapping transformation.

In the exemplary embodiment, when no information in the tone mapping look-up table matching with the maximum brightness information and the average brightness information of the tone mapping data group are found, whether the maximum brightness information and the average brightness information of the tone mapping data group can be replaceable by corresponding adjacent data range is determined, a similar tone mapping data group which can be used to replace the above maximum brightness information and the average brightness information is selected, as such it facilitates to change the tone mapping data group for performing the tone mapping transformation in real time.

Optionally, in another exemplary embodiment, after the step S24 of confirming whether the maximum brightness information and the average brightness information of one of the blocks is replaceable by the maximum brightness information and the average brightness information of an adjacent block, the method further includes:

Step S242, debugging and generating a new tone mapping data group according to the maximum brightness information and the average brightness information, if the maximum brightness information and the average brightness information of one of the blocks fail to be replaceable by the maximum brightness information and the average brightness information of an adjacent block in the tone mapping look-up table; and Step S243, storing the maximum brightness information, the average brightness information, and a corresponding dynamic range and average brightness information in the new tone mapping data group, into the tone mapping look-up table.

Based on the actual hardware platform parameter, it is conducted to debug according to the maximum brightness information and the average brightness information, to obtain a new tone mapping data group which is suitable for the dynamic range of the actual hardware platform, and the debugged tone mapping data group is added into the tone mapping look-up table.

In the exemplary embodiment, the acquired maximum brightness information and average brightness information that cannot be matched to the tone mapping data group in the tone mapping look-up table are re-debugged in the actually running hardware platform, and the re-debugged tone mapping data group is added into the tone mapping look-up table to update the data information in the tone mapping look-up table, which is facilitate to perform the tone mapping transformation on the HDR10 video again, and the cost of running resources in the process of tone mapping transformation is reduced, and the processing efficiency of the processor is also improved.

Furthermore, in another exemplary embodiment, the step S10 of acquiring maximum brightness information and average brightness information of a frame to be displayed on the display terminal further includes:

Step S13, setting a lag time for acquiring the maximum brightness information and the average brightness information on the basis of a hardware parameter of the display terminal, and acquiring the maximum brightness information and the average brightness information after the lag time.

The lag time is regarded as an intervals at which the maximum luminance information and the average luminance information of the frame are acquired twice. In the process of monitoring the maximum brightness and the average brightness of the frame in real time, the maximum brightness information and the average brightness information of the frame collected this time may be the same as the maximum brightness information and the average brightness information of the frame acquired next time. At this time, the same group of tone mapping data in the tone mapping look-up table is called to perform the tone mapping transformation. If one tone mapping data group is frequently called, which causes that different tone mapping transformation results are calculated out using the same tone mapping data group, resulting in unstable picture brightness.

In the exemplary embodiment, the lag time is set, and the time between acquiring the appropriate tone mapping data and transforming the tone mapping is increased, which may avoid frequently calling the same group of tone mapping data to perform the tone mapping transformation, thereby shielding that two tone mapping transformation results are calculated according to the same tone mapping data group, thereby keeping the frame brightness stable.

An exemplary embodiment is illustrated to assist in understanding the dynamic tone mapping method of the present disclosure. For example, fora HDR10 video, a frame is obtained through a HDR Decoder, and the frame is divided into m×n blocks. The maximum sub-brightness information and the average sub-brightness information of each of the blocks of the frame are monitored, then the maximum sub-brightness information and the average sub-brightness information of the blocks are counted and averaged to generate the maximum brightness information and the average brightness information of the current frame. For example, the maximum brightness of 4000 nits and the average brightness of 500 nits are debugged to match with a tone mapping data group in the tone mapping look-up table which has the average brightness of 500 nits and the maximum brightness of nits. For example, the tone mapping data group has the dynamic range of 0.001 nits to 2000 nits and the average brightness of 300 nits, the dynamic range is 0.001 to 2000 nits, and the average is 0.001 to 2000 nits. When tone mapping data group has the dynamic range of 0.001 nits to 2000 nits and the average brightness of 300 nits, and the tone mapping transformation is conducted to the frame according to the tone mapping data group having the dynamic range of 0.001 nits to 2000 nits and the average luminance of 300 nits, and the cycle is performed unit the above the HDR10 video is over.

Figure 3:
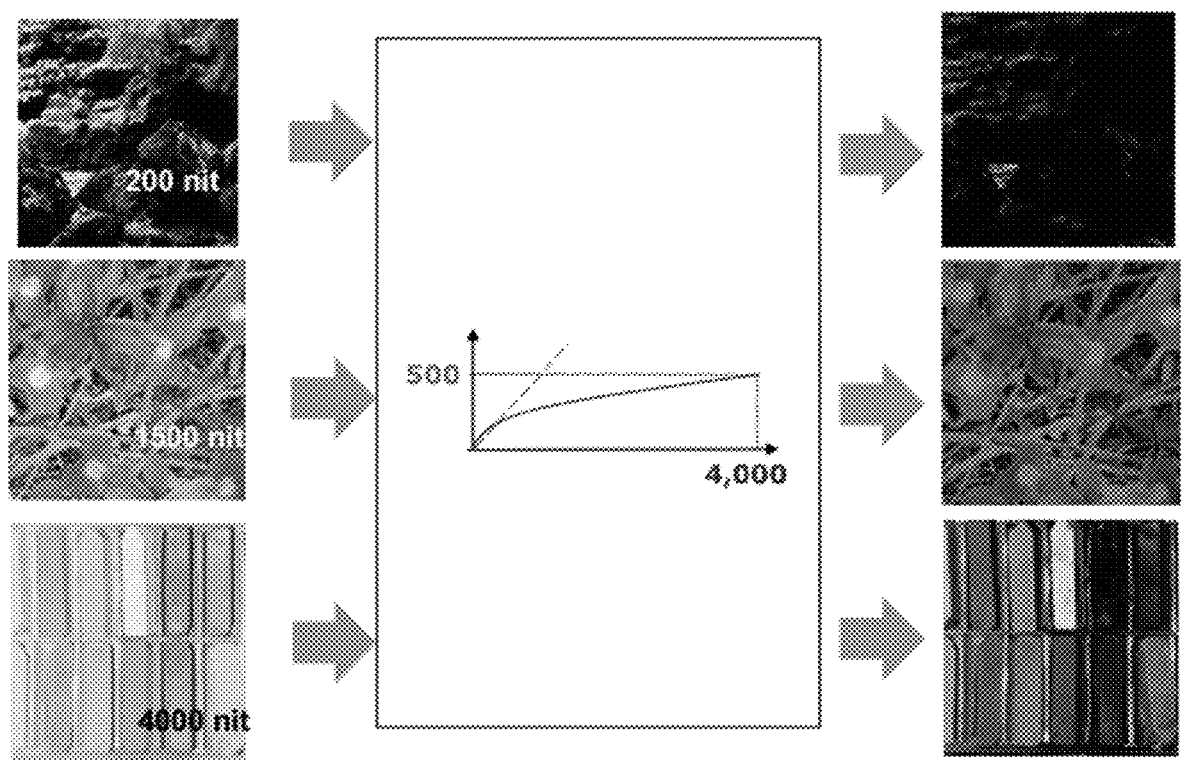
FIG. 3 is an effect diagram of transforming tone mapping on the pictures having different brightness through the same tone mapping data group according to the dynamic tone mapping method of the present disclosure.
Figure 4:
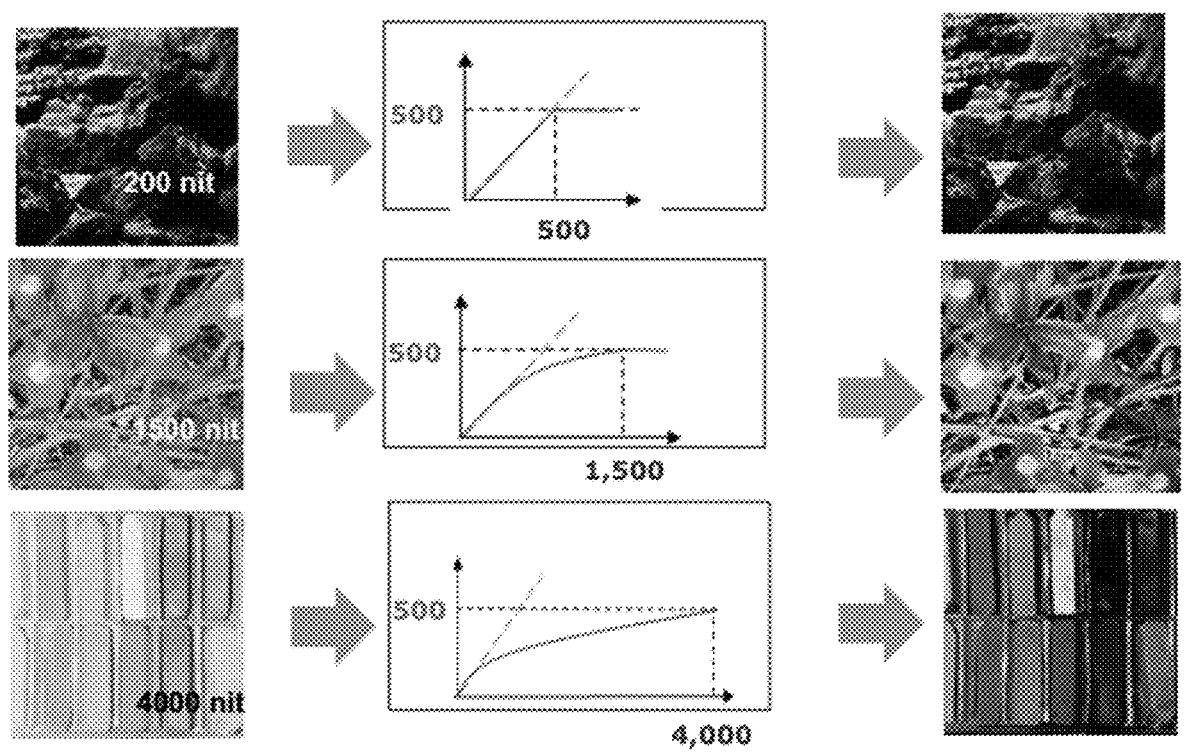
FIG. 4 is an effect diagram of transforming tone mapping on the pictures having different brightness through different tone mapping data groups according to the dynamic tone mapping method of the present disclosure.

An exemplary embodiment is illustrated to assist in understanding the beneficial effects of the dynamic tone mapping method of the present disclosure. As shown in FIG. 3, the tone mapping transformation is performed to the left three images to get the right three images based on the average brightness of 500 nits and the maximum brightness of 4000 nits. In FIG. 3, the three images with different brightness are subjected to the tone mapping transformation under the same condition, the highlighted parts of the three transformed images can be displayed normally, but the lower brightness parts of the images are compressed because the brightness of the lower brightness parts exceed the dynamic range of the display of the hardware. The compressed images cannot be fully expanded and cannot be displayed normally. In FIG. 4, the left three images are the same as the left three images in FIG. 3, then the three images in FIG. 4 are tone mapped respectively according to their respective maximum brightness, average brightness to obtain the right there images. At this time, the three images are respectively subjected to tone mapping according to the maximum brightness and the average brightness of each picture, and the three pictures on the right side in FIG. 4 are obtained. It can be seen that three images having different brightness are subjected to tone mapping transformation on the basis of the maximum brightness information and average brightness information of the tone map group obtained according to their respective brightness information, as such the highlighted parts and the low brightness parts of the frame can be normally displayed. Therefore, the tone mapping data group can be changed in real time according to the maximum brightness information and the average brightness information of the frame monitored in real time, to reasonably utilize the hardware dynamic range and present a better HDR effect.

The present disclosure further provides a mobile terminal, which includes: a memory, a processor, and a dynamic tone mapping program stored on the memory and executable on the processor, the dynamic tone mapping program when executed by the processor performs the operations of each of the exemplary embodiments of the dynamic tone mapping method described above.

The present disclosure further provides a computer readable storage medium, a dynamic tone mapping program is stored in the computer readable storage medium, the dynamic tone mapping program when executed by a processor performs the operations of the dynamic tone mapping method described above.

The exemplary embodiments of the mobile terminal and the computer readable storage medium of the present disclosure include all the technical features of the exemplary embodiments of the dynamic tone mapping method described above. The expansion and explanation of the specification are substantially the same as each of the exemplary embodiments of the dynamic tone mapping method described above. No need to repeat again.

It needs to be noted that in the present disclosure, the terms "comprising", "including" or other variants aim to cover non-exclusive inclusion, such that the processes, methods, articles or devices including a series of factors not only include these factors, but also include other factors not listed explicitly, or further comprise include intrinsic for such processes, methods, articles or devices. In the absence of more limitations, the factors limited by "comprising a . . . " do not exclude that additional identical factors are also included in the processes, methods, articles or devices comprising said factors.

The sequence number in the above embodiments of the present disclosure is only for the purpose of explanation and not intended to indicate the merits of the embodiments.

Through above description of the embodiments, it should be understood by a person skilled in the art that the present disclosure may be implemented by means of software in connection with necessary universal hardware platform. Of course, the present disclosure may also be implemented by a hardware. However, in many cases the former is more preferred. Based on this understanding, all or the part contributing to the prior art of the technical solution of the present disclosure may be embodied in the form of software. The computer software may be stored in a storage medium (such as ROM/RAM, diskette, or light disk) and include a plurality of instructions which are used to implement the method as described in the various embodiments of the present disclosure by a mobile terminal (such as cell phone, computer, server, air conditioner, or networking devices, etc.).

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure. Therefore, the scope of protection of this disclosure shall be subject to the claims.

What is claimed is:

1. A dynamic tone mapping method, comprising:
pre-generating a tone mapping look-up table which comprises a plurality of tone mapping data groups, wherein each of the tone mapping data groups comprises a dynamic range and an average brightness, and the dynamic range and the average brightness in each of the tone mapping data groups are debugged based upon hardware parameters, and each of the tone mapping data groups corresponds to maximum brightness information and average brightness information;
acquiring maximum brightness information and average brightness information of a frame to be displayed on a display terminal;
inquiring a tone mapping data group in the tone mapping look-up table based n the acquired maximum brightness information and the acquired average brightness information of the frame to be displayed; and
calling the inquired tone mapping data group and transforming a tone mapping by the dynamic range and the average brightness of the inquired tone mapping data group on the frame to be displayed on the display terminal, wherein
the operation of "inquiring atone mapping data group in the tone mapping look-up table based on the acquired maximum brightness information and the acquired average brightness information of the frame to be displayed", further comprises:
determining whether the acquired maximum brightness information and the acquired average brightness information have a correspondence with the dynamic range and the average brightness of the tone mapping data group in the tone mapping look-up table; and
if yes, calling the inquired tone mapping data group and transforming the tone mapping by the dynamic range and the average brightness of the inquired tone mapping data group on the frame to be displayed on the display terminal, and
if no, determining whether the maximum brightness information and the average brightness information is replaceable by another maximum brightness information and another average brightness information having adjacent values which has a correspondence with one of the tone mapping data groups.

2. The method according to claim 1, wherein the operation of acquiring maximum brightness information and average brightness information of a frame to be displayed on the display terminal, comprises:
dividing the frame to be displayed on the display terminal into a plurality of blocks based on a hardware parameter of the display terminal, and monitoring maximum brightness information and average brightness information of each of the blocks; and
counting statistically the maximum brightness information and the average brightness information of each of the blocks, and calculating the maximum brightness information and the average brightness information of the frame to be displayed on the display terminal.

3. The method according to claim 1, wherein after the operation of "determining whether the maximum brightness information and the average brightness information is replaceable by another maximum brightness information and another average brightness information having adjacent values which has a correspondence with one of the tone mapping data groups", the method further comprises:
researching the tone mapping data group respectively corresponding to the replaced maximum brightness information and the replaced average brightness information in the tone mapping look-up table, if the maximum brightness information and the average brightness information is replaceable by another maximum brightness information and another average brightness information having adjacent values which has a correspondence with one of the tone mapping data groups.

4. The method according to claim 1, wherein after the operation of "determining whether the maximum brightness and the average brightness is replaceable by another maximum brightness and another average brightness having adjacent values which has a correspondence with one of the tone mapping data groups", the method further comprises:
debugging and generating a new tone mapping data group according to the maximum brightness information and the average brightness information, if the maximum brightness information and the average brightness information of one of the blocks fail to be replaceable by the maximum brightness information and the average brightness information of an adjacent block in the tone mapping look-up table; and
storing the maximum brightness information, the average brightness information, and a corresponding dynamic range and average brightness information in the new tone mapping data group, into the tone mapping look-up table.

5. The method according to claim 1, wherein the operation of acquiring maximum brightness information and average brightness information of a frame to be displayed on the display terminal, comprises:
setting a lag time for acquiring the maximum brightness information and the average brightness information on the basis of a hardware parameter of the display terminal, and acquiring the maximum brightness information and the average brightness information after the lag time.

6. A mobile terminal, comprising: a memory, a processor, and a dynamic tone mapping program stored on the memory and executable on the processor, the dynamic tone mapping program when executed by the processor performing the following operations:
pre-generating a tone mapping look-up table which comprises a plurality of tone mapping data groups, wherein each of the tone mapping data groups comprises a dynamic range and an average brightness, and the dynamic range and the average brightness in each of the tone mapping data groups are debugged based upon hardware parameters, and each of the tone mapping data groups corresponds to maximum brightness information and average brightness information;
acquiring maximum brightness information and average brightness information of a frame to be displayed on a display terminal;
inquiring a tone mapping data group in the tone mapping look-up table based on the acquired maximum brightness information and the acquired average brightness information of the frame to be displayed; and
calling the inquired tone mapping data group and transforming a tone mapping by the dynamic range and the average brightness of the inquired tone mapping data group on the frame to be displayed on the display terminal, wherein the operation of "inquiring a tone mapping data group in the tone mapping look-up table based on the acquired maximum brightness information and the acquired average brightness information of the frame to be displayed", further comprises:
determining whether the acquired maximum brightness information and the acquired average brightness information have a correspondence with the dynamic range and the average brightness of the tone mapping data group in the tone mapping look-up table; and
if yes calling the inquired tone mapping data group and transforming the tone mapping by the dynamic range and the average brightness of the inquired tone mapping data group on the frame to be displayed on the display terminal, and
if no, determining whether the maximum brightness information and the average brightness information is replaceable by another maximum brightness information and another average brightness information having adjacent values which has a correspondence with one of the tone mapping data groups.

7. The mobile terminal according to claim 6, wherein the operation of acquiring maximum brightness information and average brightness information of a frame to be displayed on the display terminal, comprises:
dividing the frame to be displayed on the display terminal into a plurality of blocks based on a hardware parameter of the display terminal, and monitoring maximum brightness information and average brightness information of each of the blocks; and
counting statistically the maximum brightness information and the average brightness of each of the blocks, and calculating the maximum brightness information and the average brightness information of the frame to be displayed on the display terminal.

8. The mobile terminal according to claim 6, wherein after the operation of "determining whether the maximum brightness information and the average brightness information is replaceable by another maximum brightness information and another average brightness information having adjacent values which has a correspondence with one of the tone mapping data groups", the method further comprises:
researching the tone mapping data group respectively corresponding to the replaced maximum brightness information and the replaced average brightness information in the tone mapping look-up table, if the maximum brightness information and the average brightness information is replaceable by another maximum brightness information and another average brightness information having adjacent values which has a correspondence with one of the tone mapping data groups.

9. The mobile terminal according to claim 6, wherein after the operation of "determining whether the maximum brightness and the average brightness is replaceable by another maximum brightness and another average brightness having adjacent values which has a correspondence with one of the tone mapping data groups", the method further comprises:
debugging and generating a new tone mapping data group according to the maximum brightness information and the average brightness information, if the maximum brightness information and the average brightness information of one of the blocks fail to be replaceable by the maximum brightness information and the average brightness information of an adjacent block in the tone mapping look-up table; and
storing the maximum brightness information, the average brightness information, and a corresponding dynamic range and average brightness information in the new tone mapping data group, into the tone mapping look-up table.

10. A non-transitory computer readable storage medium, wherein a dynamic tone mapping program is stored in the computer readable storage medium, and the dynamic tone mapping program when executed by a processor performs the following operations:
pre-generating a tone mapping look-up table which comprises a plurality of tone mapping data groups, wherein each of the tone mapping data groups comprises a dynamic range and an average brightness, and the dynamic range and the average brightness in each of the tone mapping data groups are debugged based upon hardware parameters, and each of the tone mapping data groups corresponds to maximum brightness information and average brightness information;
acquiring maximum brightness information and average brightness information of a frame to be displayed on a display terminal;
inquiring a tone mapping data group in the tone mapping look-up table based on the acquired maximum brightness information and the acquired average brightness information of the frame to be displayed; and
calling the inquired tone mapping data group and transforming a tone mapping by the dynamic range and the average brightness of the inquired tone mapping data group on the frame to be displayed on the display terminal, wherein
the operation of "inquiring a tone mapping data group in the tone mapping look-up table based on the acquired maximum brightness information and the acquired average brightness information of the frame to be displayed", further comprises:
determining whether the acquired maximum brightness information and the acquired average brightness information have a correspondence with the dynamic range and the average brightness of the tone mapping data group in the tone mapping look-up table; and
if yes, calling the inquired tone mapping data group and transforming the tone mapping by the dynamic range and the average brightness of the inquired tone mapping data group on the frame to be displayed on the display terminal, and
if no, determining whether the maximum brightness information and the average brightness information is replaceable by another maximum brightness information and another average brightness information having adjacent values which has a correspondence with one of the tone mapping data groups.

11. The non-transitory computer readable storage medium according to claim 10, wherein the operation of acquiring maximum brightness information and average brightness information of a frame to be displayed on the display terminal, comprises:
dividing the frame to be displayed on the display terminal into a plurality of blocks based on a hardware parameter of the display terminal, and monitoring maximum brightness information and average brightness information of each of the blocks; and
counting statistically the maximum brightness information and the average brightness information of each of the blocks, and calculating the maximum brightness information and the average brightness information of the frame to be displayed on the display terminal.

* * * * *